Aug. 19, 1930.          F. A. STIRRUP          1,773,693
                         LATCH FOR COVERS
                        Filed Aug. 12, 1926
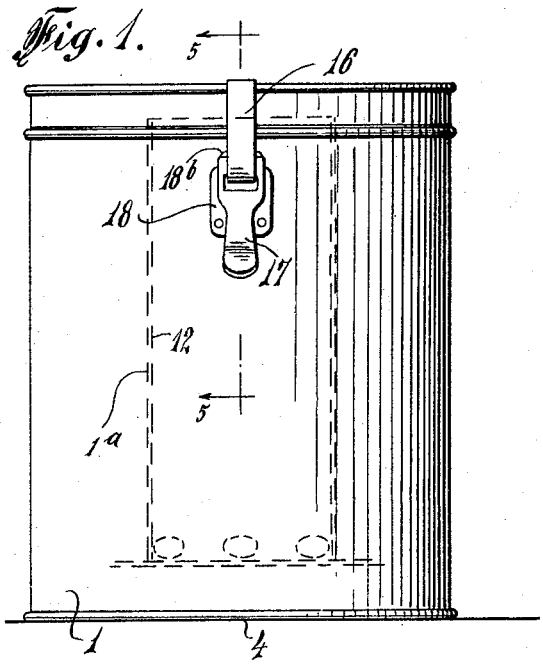
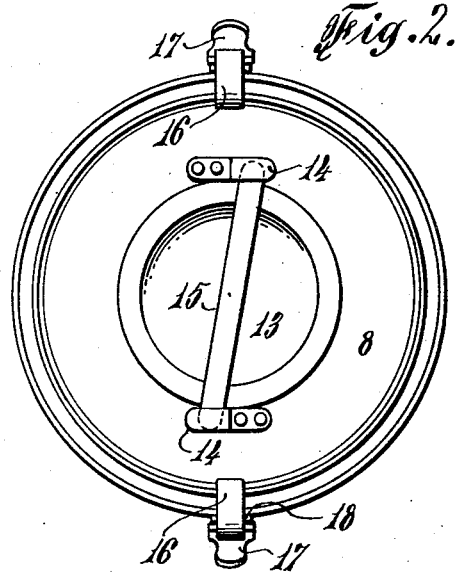
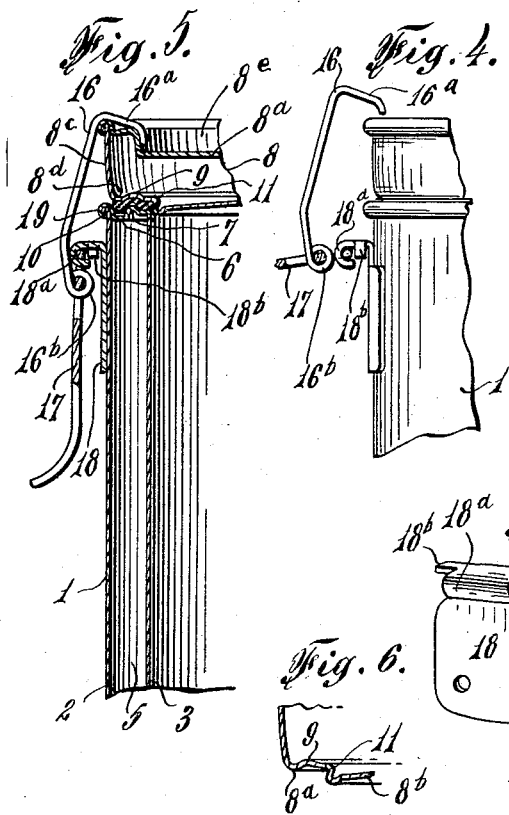
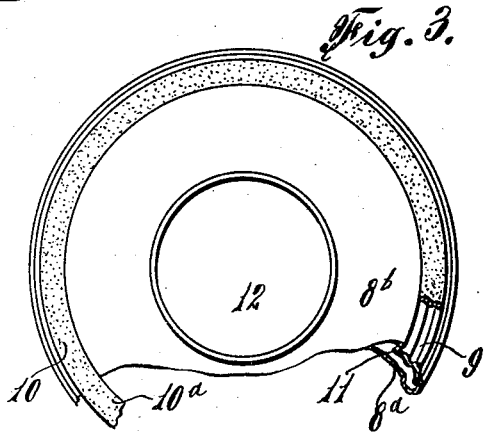
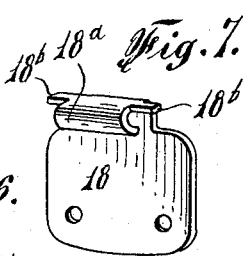
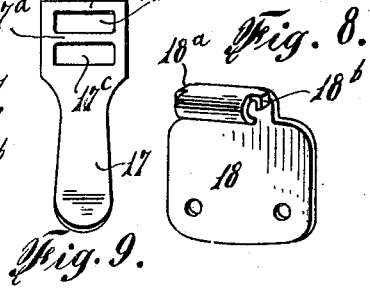
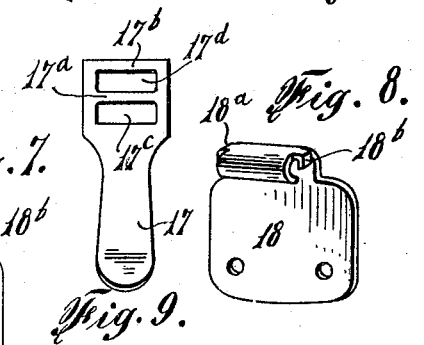
INVENTOR
Frank A. Stirrup
BY
ATTORNEY Patented Aug. 19, 1930

1,773,693

UNITED STATES PATENT OFFICE

FRANK A. STIRRUP, OF WESTFIELD, NEW JERSEY, ASSIGNOR TO THE STIRRUP MANUFACTURING COMPANY, INCORPORATED, A CORPORATION OF NEW YORK

LATCH FOR COVERS

Application filed August 12, 1926. Serial No. 128,762.

An object of my invention is to provide simple and efficient means for detachably securing a cover upon a vessel.

My invention comprises novel details of improvement that will be more fully hereinafter set forth and then pointed out in the claim.

Reference is to be had to the accompanying drawings forming a part hereof, wherein Fig. 1 is a side elevation of an ice cream freezer or container embodying my invention;

Fig. 2 is a plan view;

Fig. 3 is a partly broken inverted plan view of the cover;

Fig. 4 is a detail side view;

Fig. 5 is a detail vertical section;

Fig. 6 is a sectional detail of part of the cover;

Fig. 7 is a detail of the stationary member of the fastening means;

Fig. 8 is a similar view showing lugs of the stationary member bent into position to retain the operating lever; and Fig. 9 is a face view of said lever.

Similar numerals of reference indicate corresponding parts in the several views.

The numeral 1 indicates a casing or container shown having double walls, comprising an outer cylinder or shell 2 and an inner cylinder or shell 3 suitably spaced apart and having a bottom 4 secured to said shells in a well known way, providing an air space 5 between the shells, such as in my Letters Patent No. 1,571,609, granted February 2, 1926. The outer end of the space 5 is closed by a ring-like member 6 suitably secured to the shells 2 and 3 at the open end of the casing. The member 6 is provided with an annular outwardly projecting rib 7 located in position over the space 5 between the shells 2 and 3, (Fig. 5), and around the open end of the casing. A cover is indicated at 8 adapted to rest over the member 6, which member affords a ledge to support the cover. The cover is shown provided with double walls comprising an outer wall 8ª and an inner wall 8ᵇ having an outer rim 8ᶜ. The parts 8ᵇ and 8ᶜ may be made in a single piece of material suitably stamped or spun and providing a marginal portion 8ᵈ that rests over the member 6. The marginal portion 8ᵈ of the cover has an inwardly extending annular groove or indentation 9 that opposes and is complemental to the rib 7 of member 6, (Fig. 5), for the purpose of making a tight fit. A gasket 10, which may comprise a rubber ring, is located between the member 6 and the marginal portion 8ᵈ of the cover when the latter is upon the casing 1, thus opposing the portion 8ᵈ, and in such position of the parts the rib 7 will force the gasket into the groove or indentation 9 of the cover to make a tight fit to prevent leakage from the casing where the cover is fitted thereon. The rib 7 may project inwardly toward space 5 and the groove 9 may face outwardly respecting cover portion 8ᵈ with a similar effect of making a tight joint with the gasket. In order to keep the gasket in place when the cover is removed and handled I provide an annular inwardly extending groove 11 at the junction between the cover member 8ᵇ and the marginal portion 8ᵈ, into which the inner edge of the gasket 10 extends. By making the gasket of ring-like form and of sufficient minimum diameter within its inner circumference at the edge 10ª said edge may be sprung into the annular recess 11 of the cover and will fit snugly therein, whereby the gasket is retained upon the cover against the marginal portion 8ᵈ so that there will be no danger that the gasket will become detached during use of the freezer.

A suitable chamber 12 for the cream or other material to be frozen or cooled is attached to the cover and depends into a perforated cylinder 1ª secured to the bottom 4 within the casing 1. The construction of such parts may be similar to those set forth in my aforesaid Letters Patent. A cover 13 is detachably fitted at the open end of the chamber 12 and may be secured in place by means of lugs 14 on the cover under which the projecting ends of a bar 15 secured on the cover may operate for detachably retaining the cover 13 upon cover 8.

To detachably secure the cover 8 upon the casing I provide a hook-like member 16 having its free end bent in hook-like form at 16ª to engage the marginal portion of cover 8, the free end of the member being shown adapted to enter the depression 8$^e$ in the cover, which member is pivotally attached to a pivotally supported lever 17 located on the exterior of the casing. The lever 17 is provided with a pivot bar 17$^a$ around which the end portion 16$^b$ of member 16 is coiled for pivotally connecting the parts 16 and 17 together. The lever 17 has at one end a cross bar 17$^b$ for pivotally supporting the lever. The parts 17$^a$, 17$^b$ may be formed by stamping or casting openings 17$^c$, 17$^d$ in the metal of the lever. At 18 is a bracket for pivotally supporting lever 17. Said bracket is shown in the form of a piece of metal having a hook-like portion 18$^a$ at its upper end projecting outwardly from casing 1, to the side of which casing the bracket 18 may be attached by means of rivets or in any other desired way. The base portion of the hook-like part 18$^a$ of bracket 18 is provided with lugs or ears 18$^b$, preferably projecting on opposite sides thereof, as indicated in Figs. 7 and 8. The construction described is such that the hook-like member 18$^a$ may remain in the position shown in the drawings so that the lever 17 may be applied to the bracket by passing the hook-like portion 18$^a$ through the opening 17$^d$ of the lever to nest the pivotal bar 17$^b$ of the lever in the grooved portion of bracket 18 as a pivotal point, and the lugs 18$^b$ then may be bent to the position shown in Fig. 8, (Figs. 4, 5 and 8), whereby said lugs when so bent will extend in the space between the adjacent end of lever 17 and the bracket 18, behind the lever, to obstruct the lever and prevent it from becoming detached from the hook-like part 18$^a$ of the bracket 18, to retain the lever pivoted on the bracket. When the parts are assembled, as stated, the lever bar 17$^b$ will be pivoted in the hook-like portion 18$^a$ of the bracket. When it is desired to secure the cover upon the casing the lever 17 will be swung outwardly and upwardly to detach the hook-like member 16 from the cover, (Fig. 4), and then the member 16 may be swung away from the cover to permit its removal. When the cover is to be fastened upon the casing the hook-like member 16 will be placed over the margin of the cover and the lever 17 will be swung down, whereupon the member 16 will be drawn against the cover by the lever and the latter and said parts will remain in the position shown in Fig. 5, whereby the cover will be pressed upon the casing and the gasket will be clamped firmly between the member 6 and the marginal portion 8$^d$ of the cover to prevent leakage.

Two or more of the securing devices comprising members 16, levers 17 and brackets 18 may be attached to the casing in any desired spaced relation for securing the cover at different points of engagement.

An advantage of my improved cover-securing means is that the brackets 18 may be secured to the exterior wall 2 of the casing before the parts 2, 3, 4 and 6 are assembled together by a seamed joint at 19, as in an ordinary metal seaming machine, without interference with the members 16 and levers 17, so that there will be no injury from the latter parts to the operator of the seaming machine. After the casing has been completed the levers 17 may be applied to their respective brackets 18 and the lugs 19 may be turned to the position shown in Fig. 8 for pivotally securing the levers 17 to the brackets. The construction described also is simple and cheap to manufacture, efficient in use, and effective for the purpose intended.

While I have described my improvements as applicable in an ice cream freezer, they will be found useful in containers for other purposes, particularly where covers are to be detachably retained upon casings or the like.

Having now described my invention what I claim is:

Means for securing a cover upon a casing comprising a lever having spaced openings providing a pivot bar between the openings and a pivot bar at the end of the lever adjacent to one of the openings, a cover retaining member pivotally attached to the first named bar, and a bracket having a hook-like portion projecting outwardly and receiving one of the openings and the second named pivot bar of the lever, the base portion of the hook-like part of the bracket having one or more lugs located in position in a space between the adjacent end of the lever and the bracket and behind the lever to obstruct the latter and prevent it from becoming detached from the hook-like portion of the bracket.

FRANK A. STIRRUP.